3,669,625
PRODUCTION OF BARIUM HYDROXIDE
Hans-Joachim Rohrborn, Lothringerstrasse 16,
Homberg (Lower Rhine), Germany
No Drawing. Continuation-in-part of application Ser. No.
674,671, Oct. 11, 1967. This application Dec. 31, 1970,
Ser. No. 103,313
Claims priority, application Germany, Oct. 13, 1966,
S 106,476
Int. Cl. C01f *11/10*
U.S. Cl. 23—186         4 Claims

ABSTRACT OF THE DISCLOSURE

Production of barium hydroxide by oxidation of barium sulfide containing solutions with molecular oxygen containing gases in the presence of an alkali metal hydroxide.

RELATED APPLICATION

This application is a continuation-in-part of my application Ser. No. 674,671, filed Oct. 11, 1967, now abandoned.

BACKGROUND OF THE INVENTION

The invention relates to the production of barium hydroxide by the oxidation of aqueous barium sulfide solutions.

It is already known that barium sulfide solutions can be partially oxidized to barium hydroxide by oxygen or free oxygen containing gas streams. Such a process is disclosed in German Pats. Nos. 35,213; 35,680; 519,891 and 526,796. It also is known that barium hydroxide can be precipitated from barium sulfide solutions by the addition of ammonium hydroxide or caustic alkalies. Such a process is disclosed in German Pats. Nos. 406,962 and 411,454, and also in U.S. Pat. No. 2,782,099.

The known processes, however, have not in all instances fulfilled the requirements for commercial operation. For instance, in the processes effecting partial oxidation with air the formation of undesired by-products, such as, for example, barium thiosulfate, could not be avoided or only unsatisfactory yields were obtained or, for instance, in the precipitation processes with alkalies, high alkali concentrations had to be employed with highly diluted barium sulfide solutions.

SUMMARY OF THE INVENTION

According to the invention barium hydroxide is produced by introducing finely divided oxygen-containing gases at raised temperatures into aqueous barium sulfide solutions and treating the solutions with an alkali metal hydroxide, such alkali metal hydroxide being added to the solutions before or during the oxidation with the oxygen-containing gases so that the hydroxide will be present during the oxidizing. Such process has all of the advantages of the above described processes but avoids their disadvantages.

DETAILED DESCRIPTION OF THE INVENTION INCLUDING PREFERRED EMBODIMENTS

According to the invention the oxidation preferably is carried out at a concentration which is slightly below the saturation concentration of the barium sulfide in the temperature range of 80–95° C. While saturation concentrations provide the upper limit for the concentrations, it is preferable to work at slightly below these concentrations to avoid precipitation problems. The concentration of the barium sulfide solution advantageously is between 150 to 300 g. of barium sulfide per liter which about corresponds to the saturation concentrations at temperatures between 45 and 75° C. The oxidation can, for example, be effectively carried out at temperatures between 70–100° C. and preferably between about 80 and 95° C.

According to the invention the quantity of alkali metal hydroxide employed is up to 10–50 mol percent with reference to the barium sulfide. As already indicated, the alkali metal hydroxide can be added before or during the oxidation. It also can be expedient to add a portion of the alkali metal hydroxide before or during the oxidation and the remainder only after the oxygen-containing gases have been introduced.

It is of special advantage to control the oxidation in such a way that according to the equation:

$$3BaS + O_2 + 2H_2O \rightarrow 2Ba(OH)_2 + BaS_3$$

a barium sulfide $BaS_x$ ($x \geq 3$) is obtained as an intermediate product which is converted according to the equation:

$$BaS_x + 2NaOH \rightarrow Ba(OH)_2 + Na_2S_x$$

so that the formation of the hydrolysis products of barium sulfide having the formula $Ba(OH)(SH) \cdot 5H_2O$ and their co-crystallization with the barium hydroxide are avoided. The formation of the higher sulfides is to be sought since such materials are much less prone to hydrolysis than BaS or $BaS_2$ and as a consequence the formation of the undesired $Ba(OH)(SH) \cdot 5H_2O$ is avoided. The overall equation of the process according to the invention therefore is:

$$3BaS + O_2 + 2H_2O + 2NaOH \rightarrow 3Ba(OH)_2 + Na_2S_3$$

When these conditions are maintained, yields of 85% and over can also be produced from concentrated barium sulfide solutions.

In order to ensure that the oxidation leads to the production of $BaS_x$ ($x \geq 3$) the oxidation is carried out under such conditions that the ratio of OH ions to SH ions is over 2.5. This ratio of the OH to SH ions is followed and controlled during the oxidation. The OH ion concentration, for instance, can be determined in a known manner by titration with HCl agaist phenolphthalein (pH 9) and the SH ions against methyl orange (pH 4). $BaS_2$ is formed at a ratio of 2.5 and as a consequence the ratio is adjusted to above this value.

In the practice of the process, the amount of NaOH to be added before starting the oxidation is constant and will depend on the BaS content of the solution. The amount of NaOH will correspond to one-half of the stoichiometric amount of BaS and will not be varied during the oxidation. The increasing of the concentration of OH ions during the oxidation follows the general equations:

(1)   $BaS + \frac{1}{2}O_2 + H_2O \rightarrow Ba(OH)_2^{(1)} + BaS_x$ (2)   $BaS_x + H_2O \rightleftharpoons Ba(OH)^{(1)}(SH)$ This concentration of OH ions at (1) is the only concentration to be considered in the determination of the OH to SH ratio. This OH to SH ratio at the beginning of oxidation and before the addition of NaOH amounts to 1 according to the equation:

$$BaS + H_2O \xrightarrow{1:1} Ba(OH)(SH)$$

The oxidizing action may also be controlled by iodometric titration of the $S^{2-}$ ions in the solution with the concentration decreasing as the oxidation advances. The iodometric titration of the $S^{2-}$ ions is an exact measurement for the grade of oxidation of the BaS solution. This method is independent of NaOH addition and the OH ions concentration.

If, during the oxidation of the barium sulfide solution, a determination is made of the ratio of OH ions to SH ions and such determination shows the ratio is not over 2.5, the ratio can be corrected so that it will be above 2.5 by increasing the feed rate of the oxygen containing gases or resuming the feed if same had been discontinued. This procedure will thus insure that the OH to SH ratio will be above 2.5 and thereby insure the production of barium hydroxide in good yield.

The process according to the invention expediently can be carried out in such apparatus or combinations of apparatus in which the oxidizing gases are drawn in during the stirring process or in which they can be introduced in finely divided form in predetermined quantities. Apparatus of this nature, for example, are flotation cells and aeration cells, such as are employed for biological purification of waste waters by aeration, gas stirrers and mixing sirens with gas supply. The oxidation of the barium sulfide solution which, for example, is heated to about 95° C. and to which the alkali metal hydroxide has been added expediently is carried out in a plurality of serially arranged single units of the type indicated so that the total time the barium sulfide remains in the oxidation apparatus, depending upon the concentration of the starting solution, is about 1 to 2 hours. The barium sulfide solution is treated in such apparatus with an excess of the oxidizing gas stream. Thus the excess of oxygen required to a great extent depends upon the structural details and efficiency of the apparatus employed. These conditions, such as distribution of the oxygen-containing gas in the liquid, however, can easily be ascertained by routine preliminary tests. As a general rule, however, about 1.5 to 2.0 times the stoichiometric amount of oxygen is required.

The process according to the invention has the advantage that it can be carried out with high barium sulfide concentrations in the starting solution. As a result high yields of barium hydroxide lying between 85 and 90% can be achieved. This is a noteworthy technical advance over the previously employed methods of precipitating barium hydroxide with caustic alkalies from dilute barium sulfide solutions, in which in view of the solubility of the barium hydroxide the yield inherently is unsatisfactory. In addition, in most processes wherein barium hydroxide was precipitated with caustic alkalies a large excess of alkali had to be used in order to obtain complete precipitation. As a result solutions were obtained which in addition to alkali metal sulfides also contained large quantities of unused alkali metal hydroxides which are difficult to reuse. In contrast to the processes which only use an oxidizing gas stream which operate with yields of about 50%, the process according to the invention which employs alkalized oxidation provides for surprisingly high yields of 85% and over. The addition of the caustic alkali prior to or during the oxidation also results in that the time required for the oxidation can be reduced to one-half or below that ordinarily required. It therefore is advantageous that the caustic alkali already be present during the oxidation.

The process according to the invention is illustrated by the following examples.

Example 1

Prior art.—An aqueous barium sulfide solution containing 300 g./liter of barium sulfide at 80° C. was heated with steam continuously to 95° C. and supplied to the first cell of a flotation cell unit consisting of 8 cells of 40 liters at the rate of 150 liters/h. The temperature of the barium sulfide solution was held at 95° C. The efficiency of the suction flotation cell was about 0.3 m.³ air/m.². The total time the barium sulfide was oxidized in the flotation cells was 2 hours.

The oxidized solution was withdrawn from the end of the flotation cell unit and freed from the barium thiosulfate and barium carbonate which were produced as by-products by filtration and the resulting clear solution cooled to 15° C. $Ba(OH)_2.8H_2O$ crystallized out in the form of fine scales. The crystallized product was removed on a centrifuge and washed. The yield of $Ba(OH)_2.8H_2O$ was about 45% based upon the barium sulfide supplied. According to such process which is operated without addition of caustic alkali, between 40 and 50% of the barium sulfide supplied, depending upon the concentration of the starting solution, can be crystallized out as barium hydroxide. Such barium hydroxide is free of barium sulfide. After the completion of the oxidation, the OH to SH ion ratio was determined by titration and found to be 2.5.

Example 2

Process according to the invention.—The oxidation procedure of Example 1 was repeated except that 70 g./liter of NaOH were added to and dissolved in the barium sulfide solution before it was subjected to the oxidation in the flotation cell unit. The OH to SH ion ratio during the oxidation was periodically determined by titration in the manner hereinbefore indicated and was maintained at an OH to SH ion ratio of 3.3. The time required for the oxidation in the presence of the NaOH was only 45 minutes.

The oxidized solution was filtered to remove solids produced in side reactions ($BaSO_3$, $Ba_2S_2O_3$ and $BaCO_3$) and cooled to 10° C. whereby $Ba(OH)_2.8H_2O$ crystallized out. The crystallized product was separated off on a centrifuge and washed. The yield was 87% based upon the barium sulfide supplied. The total sulfur content was 0.3%. After a single recrystallization in which 2 kg. of $Ba(OH)_2.8H_2O$ were dissolved in a liter of water at 80° C., the remaining total sulfur content was only 0.008%.

Example 3

The oxidation procedure of Example 1 was repeated and after its completion 70 g./l. of NaOH were added and dissolved in the resulting oxidized solution prior to cooling. Thereafter the solution was filtered and cooled down to about 10° C. to crystallize out the $$Ba(OH)_2.8H_2O$$

and the crystals separated off and washed. The OH to SH ion ratio during the oxidation was periodically determined by titration in the manner hereinbefore indicated and was maintained at an OH to SH ion ratio of 3.2. The yield was about 85% based upon the barium sulfide supplied.

I claim:

1. In a process for the production of barium hydroxide in which a molecular oxygen-containing gas is introduced into an aqueous barium sulphide solution at an elevated temperature, the oxidized solution is filtered to remove solids therefrom and the solution thereafter cooled to form barium hydroxide crystals, the improvement comprising adding an alkali metal hydroxide to the reaction solution so as to have same present during the oxidizing step to substantially increase the yield of barium hydroxide from the oxidized solution and in a shorter period of time than heretofore, said alkali metal hydroxide being added to the solution in an amount of about 10–50 mol percent with reference to the barium sulphide, the concentration of the barium sulphide being slightly below that of its saturation concentration at the temperature employed and with said oxidation being carried out at a temperature between about 70 and 100° C., and with the ratio of OH to SH ions in the reaction solution during oxidation being maintained above 2.5.

2. The process of claim 1 in which the quantity of alkali metal hydroxide added is about 50 mol percent with reference to the barium sulfide.

3. The process of claim 1 in which the alkali metal hyydroxide is added to the reaction solution before completion of the oxidation.

4. The process of claim 1 in which the alkali metal hydroxide is added to the barium sulfide solution prior to the oxidation and in which the concentration of the barium sulfide solution is between about 150 and 300 g. per liter and the oxidation is carried out at a temperature between about 80 and 95° C.

References Cited

UNITED STATES PATENTS 1,812,250   6/1931   Stuer _____ 23—186

FOREIGN PATENTS 365,198   1/1932   Great Britain _____ 23—186

OSCAR R. VERTIZ, Primary Examiner

G. ALVARO, Assistant Examiner